United States Patent [19]

Kodaira et al.

[11] Patent Number: 4,751,543
[45] Date of Patent: Jun. 14, 1988

[54] CONTROL SIGNAL GENERATOR FOR CAMERA

[75] Inventors: Takanori Kodaira; Akira Egawa, both of Tokyo, Japan

[73] Assignee: Canon Kabushiki Kaisha, Tokyo, Japan

[21] Appl. No.: 933,323

[22] Filed: Nov. 18, 1986

Related U.S. Application Data

[63] Continuation of Ser. No. 675,339, Nov. 27, 1984, abandoned.

[30] Foreign Application Priority Data

Dec. 1, 1983 [JP] Japan ............................. 58-227645
Dec. 1, 1983 [JP] Japan ............................. 58-227646

[51] Int. Cl.$^4$ .............................................. G03B 7/08
[52] U.S. Cl. ............................. 354/435; 354/437; 354/439
[58] Field of Search ............................. 354/435–441, 354/446, 448, 451–453, 458, 271.1, 230, 231, 237

[56] References Cited

U.S. PATENT DOCUMENTS

| | | | |
|---|---|---|---|
| 4,009,866 | 3/1977 | Iwata et al. | 354/439 |
| 4,053,907 | 10/1977 | Iwata et al. | 354/437 |
| 4,354,748 | 10/1982 | Grimes et al. | 354/437 |
| 4,445,762 | 5/1984 | Boccuti | 354/437 |
| 4,477,161 | 10/1984 | Kawasaki et al. | 354/271.1 |

Primary Examiner—Russell E. Adams
Attorney, Agent, or Firm—Toren, McGeady & Associates

[57] ABSTRACT

A control signal generator for a camera arranged to control the aperture of a stop by the opening degree of at least two shutter blades; to detect the opening degree of the shutter by detecting, with a photo interrupter, openings provided in one of the shutter blades; and to form a control signal based on to the opening degree of the shutter thus detected. When the shutter is closed, a shutter blade other than the blade having the openings confronts the light emitting and receiving elements of the photo interrupter to block an optical path thereby. When the shutter begins to open, the optical path is opened and the photo interrupter generates a signal indicating commencement of the opening action of the shutter.

13 Claims, 5 Drawing Sheets

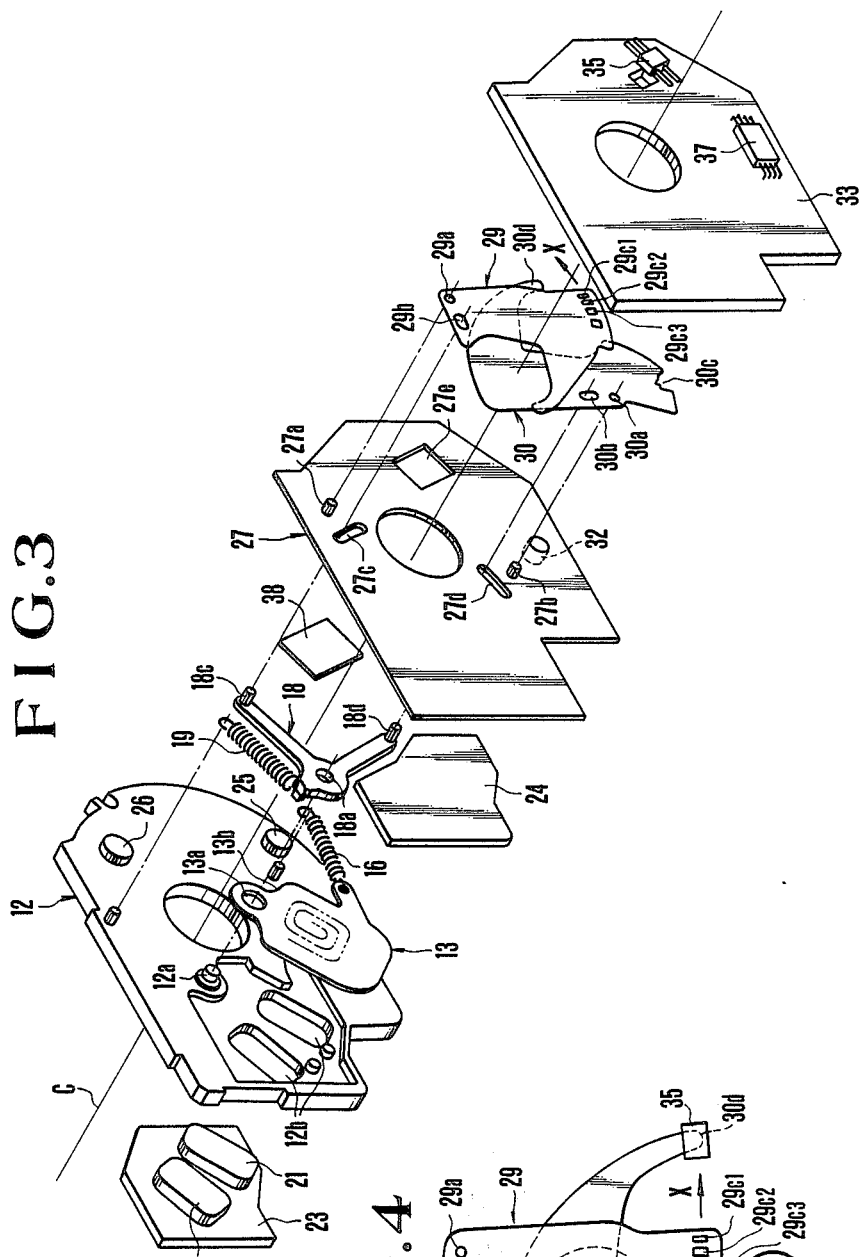
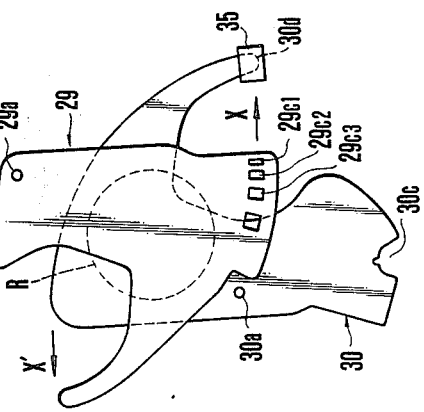

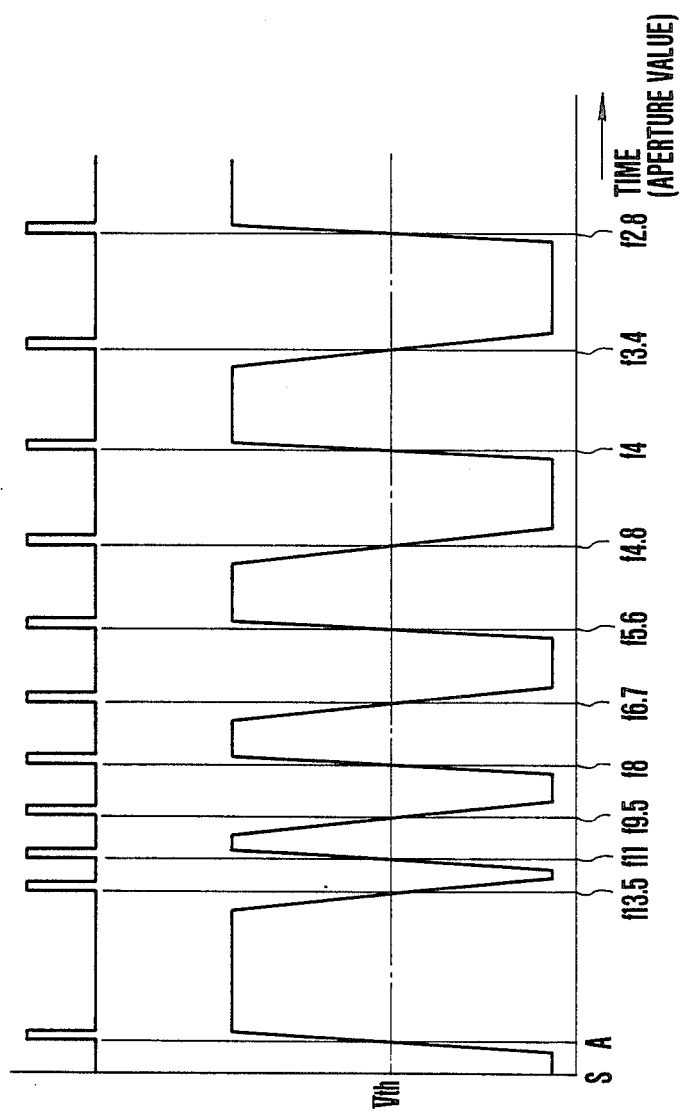

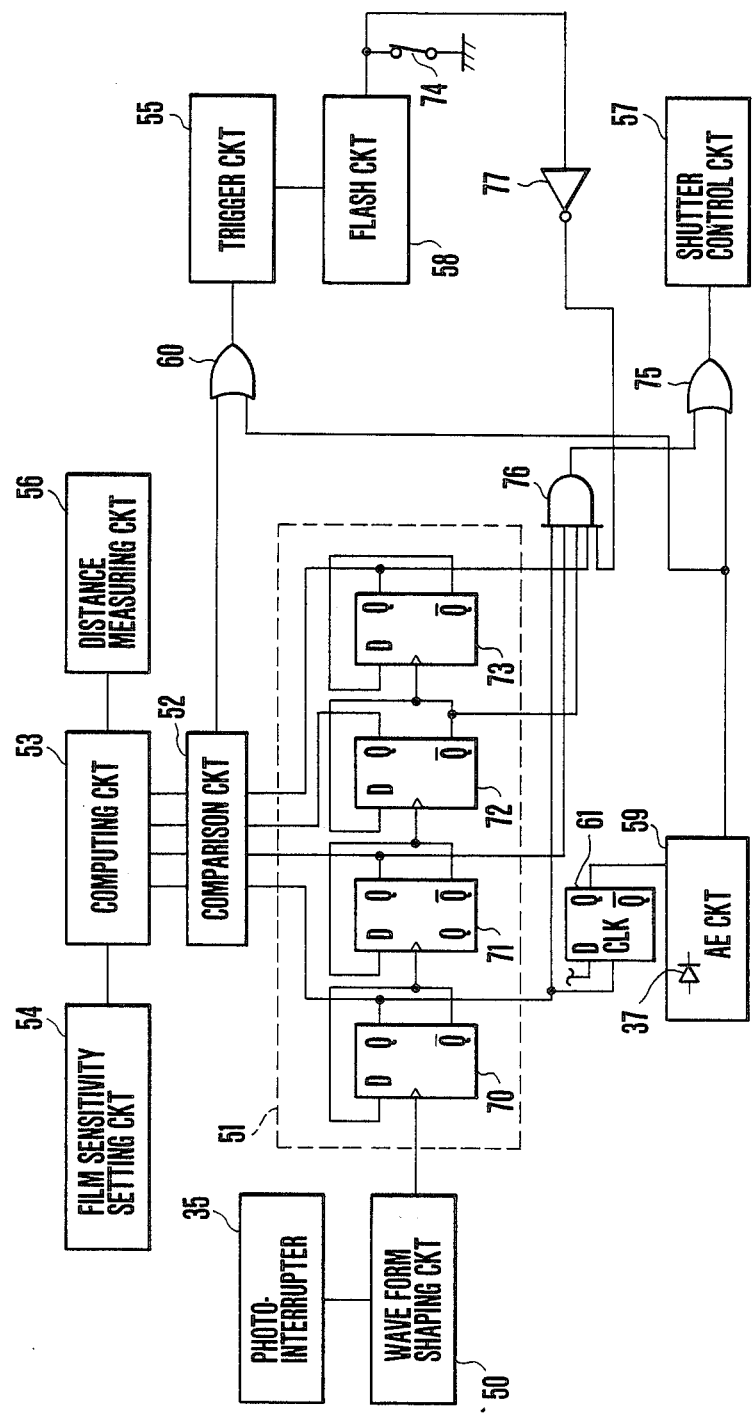

CONTROL SIGNAL GENERATOR FOR CAMERA

This is a continuation of application Ser. No. 675,339, filed Nov. 27, 1984 now abandoned.

BACKGROUND OF THE INVENTION

1. Field of the Invention

This invention relates to a control signal generator for a camera arranged to generate a control signal indicative of the opened or closed position of the blades of a shutter which also function as a stop.

2. Description of the Prior Art

In a camera of the kind having a shutter which also functions as a stop, a photo interrupter is formed by light emitting and receiving elements which are opposed to signal generating openings provided in a shutter blade. The position of shutter blades is detected by means of the photo interrupter. Japanese Laid-Open Patent Application No. SHO 58-46329 discloses a camera of this kind. In this camera, the photo interrupter first produces a signal when the shutter blades begin to move. This signal is used for closing a count swiTch for exposure control or for an automatic flashing operation. Following the first signal, the positions of the shutter blades are detected by the second and subsequent openings to produce signals accordingly. However, according to the arrangement of the photo interrupter disclosed in this patent application, the first signal and the second and subsequent signals are obtained from the same shutter blade. Therefore, a time difference between the first and second signals is naturally restricted. FIG. 1 of the accompanying drawings shows the details of the arrangement of the prior art. In FIG. 1, only the essential parts forming a shutter are shown as viewed from behind the optical path of the camera with the shutter in a closed state. A first shutter blade 1 which turns on a shaft 3 and a second shutter blade 5 which turns on another shaft 7 partly overlap each other to completely close a full open aperture R which is indicated by a broken line. These shutter blades 1 and 5 are provided with V-shaped stop blade portions as they are performing combined functions as shutter blades and stop blades. When the blades 1, 5 turn in the directions of arrows X and X' to uncover the aperture, their V-shaped opening portions jointly define a stop aperture. The shutter blade 1 has signal generating openings 1$a$1, 1$a$2, 1$a$3,—formed in its peripheral part along the turning locus thereof. Meanwhile, a couple of light emitting and receiving elements 10 are disposed to confront the turning locus X of the blade 1 and thus serve as a photo interrupter. The output of the photo interrupter first changes when an edge part 1$b$ of the shutter blade 1 reaches the couple of elements 10. This change becomes a first signal. A second signal is obtained when the openings 1$a$1 is read. Then, each of the second signals and signals subsequent thereto corresponds to an aperture position. With the photo interrupter arranged in this manner, however, the first signal is produced after the lapse of a length of time from the commencement of the movement of the shutter blade 1. The first signal would be obtainable soon after the commencement of the movement of the shutter blade 1 if the couple of elements 10 are disposed close to the edge part 1$b$ of the shutter blade 1. However, if the control arrangement of the camera requires a long time interval between the first signal and the aperture position signal which is one of the second and subsequent signals, the distance between the edge part 1$b$ and the opening 1$a$1 of the shutter blade 1 must be long. Then, this causes an increase in the size of the shutter blade 1 and thus results in an increased camera size.

Furthermore, an automatic flash photography device is also disclosed in the same Japanese patent application cited in the foregoing. According to the exposure control arrangement disclosed in that application, after the shutter begins to open, a shutter closing signal is produced either when the exposure gradually integrated reaches a value set for an apposite degreee of exposure after a time lapse or when a hand vibration preventable limit time (a time limit normally set at about 1/30 sec.) is reached, whichever is shorter. In carrying out a flash photography operation, a signal which causes the flash device to flash is produced concurrently with a shutter closing signal. FIG. 2 shows the variation of the aperture of the shutter blades 1, 5 (or stop blades) which takes place when the hand vibration preventable limit time is shorter than the length of time required for the integrated value corresponding to the set value of the apposite amount of exposure. Referring to FIG. 2, the shutter blades 1, 5 begin to open at a point S. The flash device flashes at a point B which is a time limit point in this instance. However, if flash photography is to be carried out in a dark external light condition, an exposure based on the external light and an exposure based on the flash light overlap each other. Besides, since the hand vibration preventable limit time is relatively long, a blur due to hand vibration tends to occur. If, the limit time is set at a shorter time value, the problem hand vibration may be solved. However, the shutter blades 1, 5 bounce back to a slight extent immediately after they are opened, as indicated by a range D. The limit time, therefore, sometimes lapses during the process of such a bounce. Because of this, the limit time cannot be shortened too much and thus cannot always be set at a desired time value.

This invention is directed to the solution of the above-stated problems of the prior art devices. It is therefore an object of the invention to provide a compact control signal generator for a camera, wherein openings, are provided in one of the shutter blades 1 for enabling a photo interrupter to detect the opening degree of the shutter; and the shutter blade 5 other than the specific blade 1 blocks, when the shutter is in a closed state, an optical path which the light emitting and receiving elements of a photo interrupter are confronting, so that signal generating timing can be set with great latitude.

It is another object of the invention to provide a compact control signal generator for a camera, wherein a flash device flashes when a photo interrupter detects a full open state of stop blades, so that flash photography can be carried out without being affected by hand vibrations even in a dim light.

These and further objects and features of the invention will become apparent from the following detailed description of a preferred embodiment thereof taken in conjunction with the accompanying drawings.

SUMMARY OF THE INVENTION

A control signal generator for a camera including light emitting means; light receiving means optically combined with the light emitting means for producing a signal in accordance with the receipt of a light flux emitted from the light emitting means; and exposure blades including at least two blades, one of the exposure blades having a plurality of holes. The light receiving means generates signals by detecting the holes, and another exposure blade which is other than the one of the blades having a part for blocking an optical path between the light emitting means and the light receiving means while the exposure blades are in their initial positions. The blocking part releases the optical path from the blocked state when the exposure exposure blades are actuated.

BRIEF DESCRIPTION OF THE DRAWINGS

FIG. 3 is an exploded oblique view of a shutter provided with a signal generator to which the present invention is applied.

FIG. 4 is a plan view showing the details of the shutter shown in FIG. 3.

FIG. 6(a) and 6(b) are charts showing the timing of an aperture signal produced from the arrangement shown in FIG. 5.

FIG. 7 is a block diagram showing another example of the control circuit arrangement of the camera which is provided with the sutter shown in FIG. 3.

DETAILED DESCRIPTION OF THE PREFERRED EMBODIMENT

Figure 1:
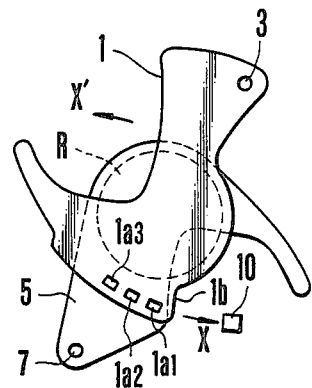
FIG. 1 is a front view showing essential parts arranged at and around a conventional shutter which is provided with a signal generator.

Referring to FIG. 3 which shows a shutter which also functions as a stop and is provided with a signal generator embodying this invention, an arrow C indicates the optical axis of a photo-taking lens of a camera and is pointing at an object to be photographed (towards the outside of the camera). The illustration includes a shutter base plate 12. A rotor 13 is provided with a printed coil which is indicated with a chain line. The hole part 13a of the rotor 13 is fitted on a pin 12a which is provided on the base plate 12. A rotor spring 16 is between the base plate 12 and the rotor 13 to urge the rotor 13 to turn counterclockwise. An opening lever 18 is provided with a hole 18a which is fitted on the pin 12a to permit the lever 18 to be turnable on the pin 12a. An opening spring 19 is between the lever 18 and the base plate 12 to urge the former to turn clockwise. The opening lever 18 is provided with a protrudent claw (not shown) which is formed on the side of the lever 18 facing the rotor 13 and which abuts and edge part 13b of the rotor 13. The rotor spring 16 is stronger than the opening spring 19. Therefore, the clockwise turn of the opening lever 18 is prevented by the rotor spring 16. Magnets 21 and 22, which are respectively magnetized in a direction opposite that of the photo-taking optical axis indicated by an arrow C, are fitted into holes 12b of the base plate 12. A front yoke 23 is secured to the magnets 21 and 22. A rear yoke 24 is opposed via the rotor 13 to the magnets 21 and 22 and is secured to the base plate 12. A magnetic circuit is formed jointly by the front yoke 23, the magnets 21 and 22 and the rear yoke 24. The rotor 13 is disposed within this magnetic circuit. When the printed coil of the rotor 13 is energized, the rotor 13 receives a clockwise driving force which turns the rotor 13 clockwise against the force of the rotor spring 16. A blade receiving plate 27 is mounted on the shutter base plate 12 through spacers 25 and 26. A first shutter blade 29 and a second shutter blade 30 are both provided with V-shaped double wing blade portions for also functioning as stop blades. Reference numeral 30d identifies one part of the double wing blade portion of the second shutter blade 30. The blade receiving plate 27 is provided with pins 27a and 27b which are fitted into holes 29a and 30a of the first and second shutter blades 29 and 30 and permit these shutter blades 29, 30 to turn thereon. The shutter blades 29 and 30 are provided with slots 29b and 30b. Pins 18c and 18d, which are provided on the opening lever 18, are fitted into these slots 29b and 30b through turning locus slots 27c and 27d, which are provided in the blade receiving plate 27. Therefore, when the opening lever 18 turns clockwise, the shutter blades 29 and 30 are opened by the clockwise turn.

Signal holes 29c1, 29c2, 29c3,—are formed in the lower part of the first shutter blade 29 and are aligned in the direction of the turning locus of the shutter blade 29, i.e. in the direction of the arrow X. While the shutter blades 29 and 30 are closed (see FIG. 4), one part of the double wing blade portion of the second shutter blade 30 is located on the turning locus X of the signal holes 29c1, 20c2, 29c3,—.

Reference numeral 33 identifies a shutter blade retaining plate. A photo interrupter 35, which consists of a light emitting element and a light receiving or photosensitive element, is disposed at an opening formed in the shutter blade retaining plate 33 in a position confronting one part of the double wing blade portion 30d with the shutter blade 30 in a closed state. Meanwhile the blade receiving plate 27 is provided with an opening 27e which is formed in a position confronting the photo interrupter 35. A reflecting mirror 38 is mounted in the opening 27e. A signal producing arrangement is thus formed jointly by the shutter blade portion 30d, the signal holes 29c1, 29c2, 29c3,—and the photo interrupter 35.

A cutout part 30c which is provided in the edge part of the second shutter blade 30 serves as an auxiliary stop. An exposure controlling photometric light flux which comes from a light measuring lens through a light guide 32 is allowed to pass through this cutout part 30c. The quantity of the photometric light increases and decreases based on the degree of turning movement of the second shutter blade 30. The retaining plate 33 is further provided with another opening which is formed in a position opposed to the light guide 32 with a light measuring element 37 disposed at the opening, so that the quantity of light passing through the cutout part 30c or auxiliary stop can be measured by the element 37.

Figure 5:
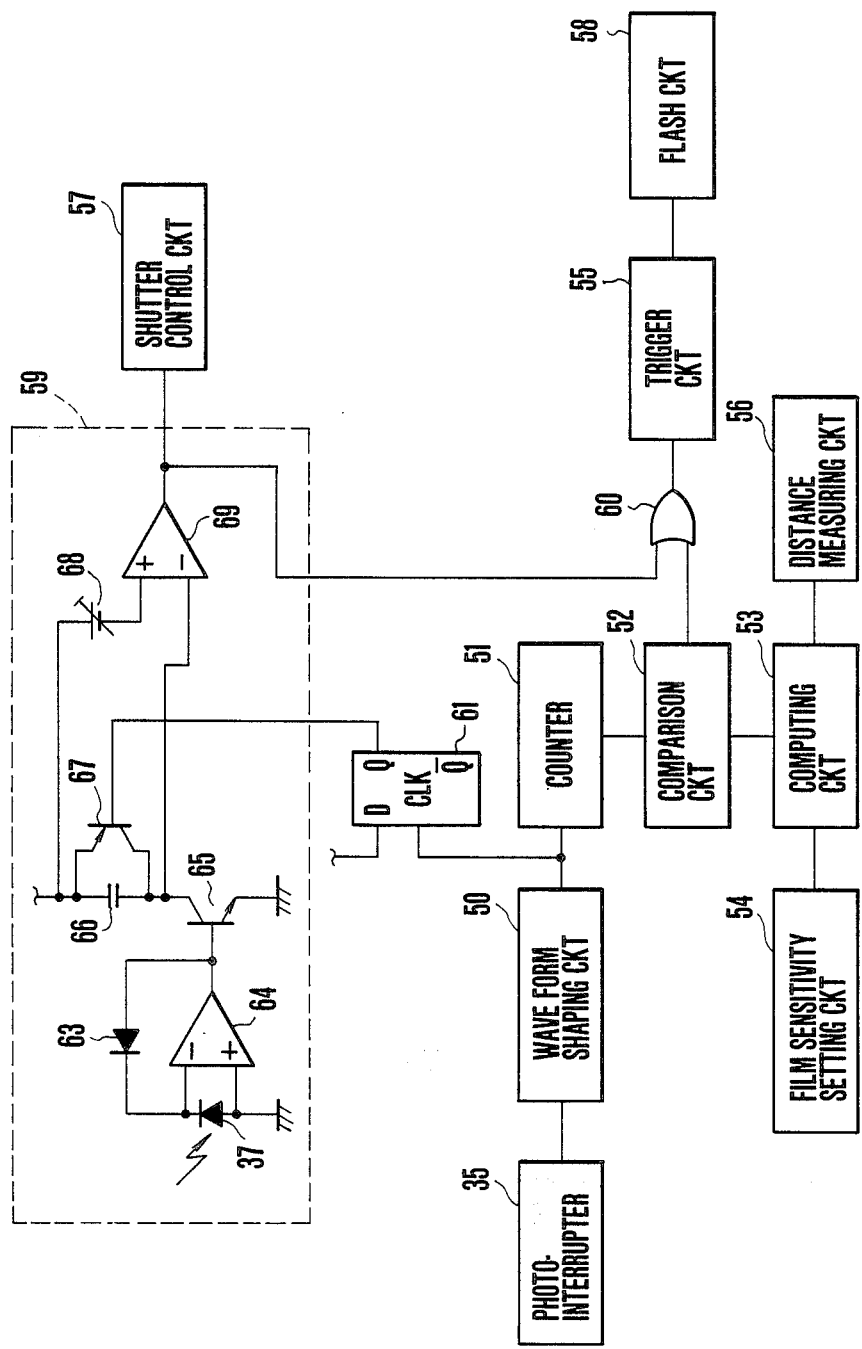
FIG. 5 is a block diagram showing the control circuit arrangement of a camera which is provided with the shutter shown in FIG. 3.

FIG. 5 is a diagram showing the circuit arrangement for controlling the operation of a camera equipped with the shutter which also functions as a stop and is arranged as described above. The illustration includes a circuit 50 which shapes the wave form of the output of the photo interrupter 35. An AE (automatic exposure) circuit 59 consisting of the light measuring element 37 which is an SPC (silicon photo cell); a compressing diode 63; an operational amplifier 64; an expanding transistor 65; a capacitor 66; a transistor 67 which discharges the electric charge of the capacitor 66; a reference voltage source 68; and a comparator 69. When the voltage of the capacitor 66 becomes higher than the voltage of the reference voltage source 68, the comparator 69 judges the exposure adequate and changes the output level from a low to a high level. The high level output of the comparator 69 is supplied to a shutter control circuit 57 and an OR gate 60. A counter 51 counts pulses produced from the shaping circuit 50. A computing circuit 53 computes a correct aperture value for flash photography on the basis of an ISO value of film sensitivity obtained from a film sensitivity setting circuit 54, a measured distance value obtained from a distance measuring circuit 56 and a guide number set based on the quantity of flash light to be emitted. A comparison circuit 52 compares the output of the counter 51 and that of the aperture computing circuit 53 and produces a high level output at the OR gate 60 when the two outputs coincide with each other. The OR gate 60 supplies a high level output thereof to a trigger circuit 55 upon receipt of a high level signal from the AE circuit 59 indicative of completion of the AE (automatic exposure) operation thereof or a high level signal output from the comparison circuit 52, whichever is received sooner. Then, this causes a flash circuit 58 to emit a flash light. The shutter, which also functions as a stop and which is arranged as described above, operates in the following manner:

FIGS. 6(a) and 6(b) show the signal output of the photo interrupter 35 produced as the shutter blades 29, 30 open. FIG. 6(a) shows the output wave form of the photo interrupter 35 and FIG. 6(b) a wave form obtained after the output shown in FIG. 6(a) is processed through the wave form shaping circuit 50. The circuit 50 produces one pulse every time the output of the photo interrupter 35 exceeds a preset value Vth. The reference symbol S identifies the closed state of the shutter blades 29, 30. The operation of the shutter begins from this state S. When a shutter release button (not shown) in the drawing is depressed, power is supplied to the coil of the rotor 13. The shutter blades 29, 30 begin to open. The second shutter blade 30 turns in the direction of the arrow X' (FIG. 4). The wing blade portion 30d of the second shutter blade 30 moves away from the optical path of the photo interrupter 35. A first signal is produced at a point A. Meanwhile, the first shutter blade 29 turns in the direction of the arrow X. The signal holes 29c1, 29c2, 29c3,—pass the optical path of the photo interrupter 35. Then, the second and subsequent signals are produced according to aperture values f 13.5, f 11, f 9.5,—. In the drawing, a signal f 2.8 is produced when the aperture is at a maximum value. The first pulse of the wave form shaping circuit 50 gives the timing for exposure commencement. When the first pulse is counted by a D type flip-flop 61, the output of the wave form shaping circuit 50 is supplied to the clock terminal of the D type flip-flop 61. The level of the output Q of the flip-flop 61 changes from a low to a high level. The output terminal Q of the flip-flop 61 is connected to the base of the count switching transistor 67 disposed within the AE circuit 59. With the level of the output Q changes from a low to a high level, the transistor 67 turns off. The capacitor 66 begins, from a discharged state, to perform an integrating action on a current which is expanded by the transistor 65. The AE circuit 59 thus operates to give an apposite exposure. When the voltage of the capacitor 66 becomes higher than the voltage of the reference voltage source 58, the comparator 69 judges the exposure to be apposite and changes its output level from a low to a high level. The high level output of the comparator 69 is supplied to the shutter control circuit 57 and the OR gate 60. Meanwhile, the pulses of the wave form shaping circuit 50 are counted by the counter 51. A count value output of the counter 51 thus obtained is supplied to one of the input terminals of the comparison circuit 52. To the other input terminal of the comparison circuit 52 is supplied a computed value output of the computing circuit 53 which obtains an aperture value by performing a computing operation on the ISO film sensitivity value obtained from the film sensitivity setting circuit 54, the measured distance value of the distance measuring circuit 56 and the guide number set based on the quantity of a flash light to be emitted from the flash device. The comparison circuit 52 compares the output of the counter 51 with that of the aperture computing circuit 53 and produces a high level output when the two outputs thus compared coincide with each other. This high level output is supplied to the OR gate 60. The OR gate 60 supplies a high level output thereof to the flash trigger circuit 55 upon receipt of a high level signal from the AE circuit 59 indicative of completion of the AE operation thereof or the high level signal output from the comparison circuit 52, whichever is received sooner. Upon receipt of the high level output of the OR gate 60, a trigger circuit 55 causes the flash circuit 58 to emit a flash light.

With the high level signal from the comparator 69 supplied to the shutter control circuit 57, the power to the rotor 13 is cut off. The rotor spring 16 causes the rotor 13 to turn counterclockwise. The edge 13b of the rotor 13 again abuts the protrudent claw of the opening lever 18. The opening lever 18 then also turns counterclockwise together with the rotor 13 to close the shutter blades 29 and 30. Exposure comes to an end.

In the signal generator arranged according to the invention as described above, the signal source for the signal produced at the beginning of the movement of the shutter blades 29, 30 is disposed at a shutter blade 29, 30 other than the shutter blade 29, 30 which is the signal source for the aperture signal. Therefore, these signals can be produced at correct points of time even if the shutter blades 29, 30 are small in size.

Furthermore, the disposition of the photo interrupter 35 may be shifted in a direction perpendicular to the turning locus X of the signal holes 29c1, 29c2, 29c3,—, so that the timing of the count switch of the exposure control circuit can be varied without influencing the aperture signal.

FIG. 7 shows, by way of example, a modification of the circuit arrangement of FIG. 5. The elements which are the same as those shown in FIG. 5 are identified by the same reference numerals and their details are omitted from the following description.

This modification includes the counter 51 having D type flip-flops 70, 71, 72 and 73, and OR gate 75, an AND gate 76, a flash mode selection switch 74 and an inverter 77.

The modification operates as follows: The distance measuring circuit 56 begins to operate when a shutter release button (not shown) is pushed. Then, the position of a lens (not shown) is shifted for focusing. Next, the rotor 13 receives power supplied to the coil thereof. The shutter blades 29, 30 begin to open. The second shutter blade 30 turns in the direction of the arrow X'. The wing blade portion 30d is retracted from the optical path of the photo interrupter 35. A first signal is produced at the point A shown in FIGS. 6(a) and 6(b). In the meantime, the first shutter blade 29 turns in the direction of the arrow X. The signal holes 29c1, 29c2, 29c3,—pass the optical path of the photo interrupter 35. The second and subsequent signals are then produced based on the aperture values f 13.5, f 11, f 9.5,—. A signal for the aperture value f 2.8 represents the maximum aperture and corresponds to the point A of FIG. 2.

In carrying out ordinary photography (without using the flash device), the switch 74 is left off. When the first pulse is counted by the counter 51, a signal is supplied to the AE circuit 59. The light measuring element 37 begins to measure light. The exposure quantity of light coming via the auxiliary stop 30c to the light measuring element 37 is integrated by the AE circuit 59 as the shutter opens. When the integrated value reaches a value set as an apposite exposure value, a shutter closing signal is produced from the shutter control circuit 57 via the OR gate 75. This signal causes the power to the rotor 13 to be cut off. The rotor spring 16 causes the rotor 13 to turn counterclockwise. The edge 13b of the rotor 13 again abuts the protrudent claw of the opening lever 18. The opening lever 18 then turns counterclockwise together with the rotor 13. This closes the shutter blades 29 and 30, bringing the exposure to an end.

In flash photography, the switch 74 is turned on. In this instance, an apposite aperture value is obtained by the aperture computing circuit 53 from the guide number of the flash device (a constant set at the aperture computing circuit 53 in a camera with a built-in flash device), the measured distance value of the distance measuring circuit 56 and the ISO value of the film sensitivity setting circuit 54. Meanwhile, the shutter opens. The output of the photo interrupter 35 produced according to an aperture value thus obtained causes a pulse signal to be supplied from the wave form shaping circuit 50 to the counter 51. The count value of the counter 51 is compared with the above-stated apposite aperture value at the comparison circuit 52. When the two values come to coincide with each other, a timing signal for flashing is supplied to the OR gate 60. In case that the apposite aperture value computed by the computing circuit 53 is f 8, for example, the flashing signal is produced when the number of pulses becomes 5 (see FIGS. 6(a) and 6(b). In the event that the exposure quantity of external light and the exposure quantity of flash light are integrated and added together at the AE circuit 59, a shutter closing signal is produced from the shutter control circuit 57 via the OR gate 75 when the added-up exposure light quantity reaches an apposite exposure light quantity. When the shutter is fully opened (to the maximum aperture value f 2.8), the shutter closing signal is produced even if the apposite exposure light quantity has not been reached. In other words, the maximum aperture value f 2.8 is represented by an eleventh pulse signal. The outputs Q of the flip-flops 70, 71, 72 and 73 are caused by this signal to become "1", "1", "1", "0" and "1" one after another. Then, a high level output of the AND gate 76 which results from the outputs Q, Q, $\overline{Q}$ and Q of the flip-flops causes the OR gate 75 to produce a high level output. Then, this output of the OR gate 75 causes the shutter control circuit 57 to operate.

Figure 2:
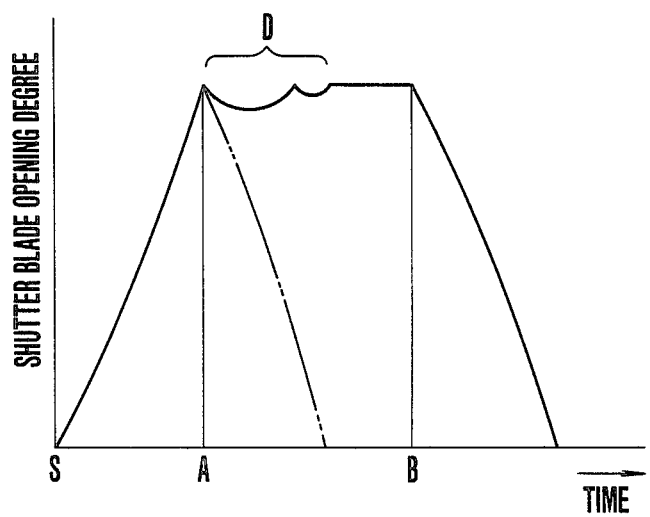
FIG. 2 is a graph showing the opening degree of the shutter blades of FIG. 1.

Further, in case that the apposite aperture value computed by the computing circuit 53 is the maximum or full open aperture value (f 2.8), a flashing signal is produced and supplied via the OR gate 60 to the trigger circuit 55 when the number of pulses becomes 11. In that instance, the output lever of the AND gate 76 also becomes high. This output actuates the shutter control circuit 57 via the OR gate 75 to have the shutter closed. In FIG. 2, the change in the shutter opening degree which takes place in that instance is indicated by a chain line.

In the flash synchronizing method of the invention as described above, the flash device flashes during an opening process or at the time of full opening of the aperture irrespective of the hand vibration preventable limit time of the shutter speed. Therefore, the adverse effect of hand vibrations can be prevented. Further, since a timing signal for flashing is obtained from a signal source disposed on the shutter, flashing can be effected at a correct shutter opening position even in the event of a slow shutter opening speed.

What is claimed is:

1. An exposure control device for a camera, comprising:
    (a) shutter means for forming an exposure aperture, said shutter means including a first movable blade and a second movable blade separately from each other;
    (b) detection means for detecting movement of said first and second movable blade separately from each other;
    (c) light measuring means for measuring light from an object to be photographed, said means starting the measuring in response to the detection of the movement of said first movable blade by said detection means; and
    (d) judging means for judging the exposure aperture formed by said shutter means in response to the detection of the movement of said second movable blade by said detection means.

2. A device according to claim 1, wherein said detection means includes light detection means.

3. A device according to claim 2, wherein said light detection means includes a photointerrupter.

4. A device according to claim 2, further comprising optical path forming means for enabling said detection means to detect the movement of said first movable blade, said optical path forming means being associated with the movement of said first movable blade.

5. A device according to claim 2, further comprising optical path forming means for enabling said detection means to detect the movement of said second movable blade, said optical path forming means being associated with the movement of said second movable blade.

6. A device according to claim 1, wherein said judging means includes shut-off means for forcedly closing said shutter means on the basis of the opening amount of said shutter means.

7. A device according to claim 6, wherein said shut-off means is arranged to operate when said shutter means reaches a maximum opening amount.

8. A device according to claim 1, wherein said judging means includes computation means for controlling a flash photography on the basis of the opening amount of said shutter means.

9. A control device for a camera, comprising:
    (a) means for forming an exposure aperture, said exposure aperture forming means including first aperture restricting means and second aperture restricting means;
    (b) control means operative in response to the opening of said exposure aperture forming means;
    (c) first instruction means for instructing said control means to start its operation, said first instruction means being associated with said first aperture restricting means; and (d) second instruction means for instructing said control means of the opening amount of said aperture forming means, said second instruction means being associated with said second aperture restricting means.

10. A device according to claim 9, wherein said control means includes computation means for controlling a flash photography on the basis of the opening amount of said aperture forming means instructed by said second aperture restricting means.

11. An exposure control device for a camera, comprising:

(a) shutter means for forming an exposure aperture;

(b) indication means for indicating a flash photography mode;

(c) detection means for detecting an actual movement of said shutter means; and (d) shut-off means for forcedly closing said shutter means in response to an indication of the flash photography mode by said indication means and detection of a maximum exposure amount of said shutter means by said detection means even if a proper exposure amount is not attained.

12. A device according to claim 11, wherein said detection means includes light detection means.

13. A device according to claim 12, wherein said light detection means includes a photointerrupter.

* * * * *